W. R. WILLIAMS.
ROAD GRADING AND DITCHING MACHINE.
APPLICATION FILED DEC. 21, 1915.
1,185,359.
Patented May 30, 1916.
2 SHEETS—SHEET 2.
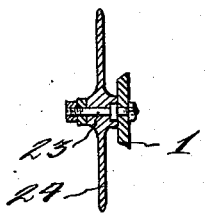
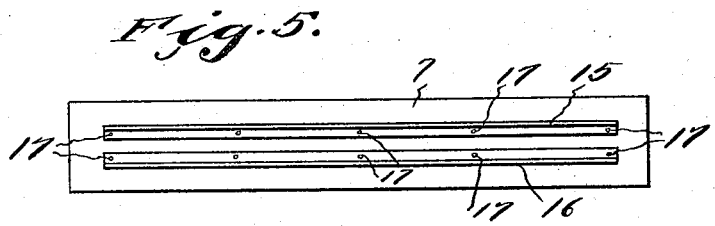
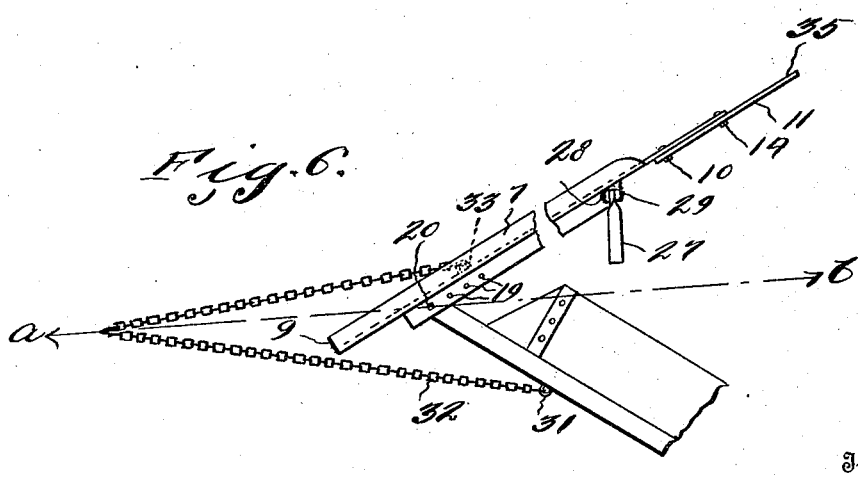
Witnesses
Inventor
W. R. Williams
By D. Swift & Co.
Attorneys

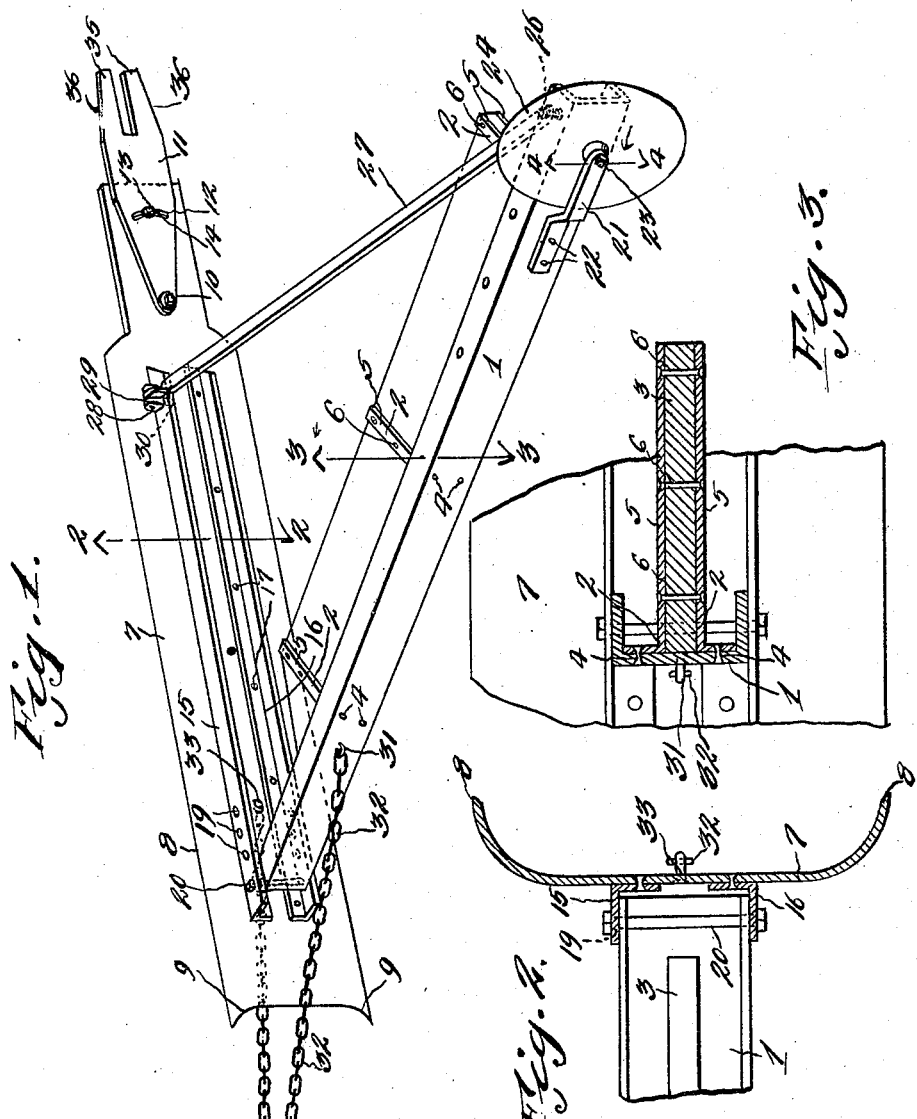

UNITED STATES PATENT OFFICE.

WILLIAM R. WILLIAMS, OF OWENSBORO, KENTUCKY, ASSIGNOR TO OWENSBORO DITCHER AND GRADER CO., OF OWENSBORO, KENTUCKY, A CORPORATION OF KENTUCKY.

ROAD GRADING AND DITCHING MACHINE.

1,185,359.      Specification of Letters Patent.      Patented May 30, 1916.

Application filed December 21, 1915. Serial No. 68,030.

*To all whom it may concern:*

Be it known that I, WILLIAM R. WILLIAMS, a citizen of the United States, residing at Owensboro, in the county of Daviess, State of Kentucky, have invented a new and useful Road Grading and Ditching Machine; and I do hereby declare the following to be a full, clear, and exact description of the invention, such as will enable others skilled in the art to which it appertains to make and use the same.

This invention relates to a new and useful road grading and ditching machine.

One of the objects of the invention is the provision of a machine of this nature comprising a land side body member and cutting member arranged angularly in plan view, so that the forward end of the cutting blade is forward or in advance of where the blade is pivoted to the body member, so as to more efficiently cut the road bed, particularly owing to the line of draft being from the body member and the cutting blade, and not in the line of the pivot of where the cutting blade and body member are pivoted together. In other words, owing to the extreme edge portion (which is sharp) of the cutting blade being in advance of the pivot between the body member and the blade, and owing to the said extreme edge being to one side of the line from where the draft or equalizing means are attached to the draft chain and the pivot between the body member and cutting blade, the forward cutting end of the cutting blade will tend to cut deeper and more accurately into the road bed, and hold the rear part of the cutting blade to its work.

It has been found that in road grading, the dirt that is moved or scraped to one side by the cutting blade, banks up against the blade, particularly after the machine has traveled some distance, thereby tending to push the rear extremity of the blade backwardly and laterally out of operative positions. Therefore, another object of the invention is to provide a road grader consisting of a land side member and a scraping blade joined substantially at their forward ends, in combination with a draft chain connected to the outer faces of the member and the blade and having its line of draft extending through the joints and between the member and the blade, which extends from each side of the line of draft and at angles thereto. The blade is extended at its forward portion at a substantial distance beyond the joint and to one side of the line of draft, whereby its cutting edge will so cut or coöperate with the road bed, as to tend to sweep the rear extremity of the blade around and forwardly, thereby producing a substantial support or backing for the dirt that banks against the blade tending to move the blade rearwardly and laterally.

Another object of the invention is to construct the joint between the member and the blade adjustable, whereby the extension of the blade may be extended a substantially greater distance to one side of the line of draft, thereby causing more of the cutting edge of the blade beyond the joint to coöperate with the road bed, to increase the forward sweeping tendency of the scraping blade.

Another object of the invention is to provide an anchor extension blade at the rear extremity of the scraping blade adapted to be adjusted to engage the road bed, to proportionately retard the sweeping tendency of the scraping blade, according to the increase or decrease of the forward extension of the scraping blade. This anchor blade also constitutes means whereby the machine may be lifted, so that it may be inverted.

Another object of the invention is to provide a road grading and ditching machine, the construction of which is an efficient, desirable, inexpensive and practical improvement over the road grading and ditching machine set forth, shown in the drawings and claimed in the applications of W. R. Williams, one of which being filed January 25, 1915, Serial No. 44,207, and allowed July 20, 1915, the other being filed Sept. 16, 1915, Serial #50,992, and which present improved construction involves new features.

One of the features of construction is the provision of a body member constructed from a channel iron, in which the running or supporting board is secured by means of angle brackets, so that the operator will have an efficient and practical support.

In practical fields the details of construction may necessitate alterations, falling within the scope of what is claimed.

The invention comprises further features and combination of parts, as hereinafter set forth, shown in the drawings and claimed.

In the drawings: Figure 1 is a view in perspective of the improved ditcher and grader constructed in accordance with the invention. Fig. 2 is a sectional view on line 2—2 of Fig. 1. Fig. 3 is a sectional view on line 3—3 of Fig. 1. Fig. 4 is a sectional view on line 4—4 of Fig. 1, showing the mounting of the supporting disk or colter. Fig. 5 is a rear elevation of the cutting or scraper blade. Fig. 6 is a plan view showing the land side member and scraping blade joined at their forward ends and having a draft chain connected to the outer faces of the member and the blade and having its line of draft, as indicated by the dot and dash line $a-b$, extending through the joint and substantially between the member and the blade, which extends at angles to said line of draft.

Referring more especially to the drawings, 1 designates a body member, which is constructed from a channel bar or iron, to insure strength and durability. Secured to the channel side of the iron or bar, by means of the angle brackets 2 is a supporting or running board 3. The angle brackets 2 are secured to the channel iron or bar, as shown at 4, while the long arm 5 of the brackets are secured at 6 to the supporting or running board. The cutting or scraping blade 7 has its upper and lower portions, curved as shown at 8 longitudinally, so as to more easily cut into the road bed. The forward portion of the blade or scraper is provided with a cutting edge, as shown at 9. The rear end portion of the cutting or scraper blade is reduced, and has pivoted thereto as at 10 an anchor blade 11. This anchor blade has a segmental slot 12, the curvature of which is concentric with the pivot 10, and extending through the slot 12 is a suitable bolt 13, which extends through the reduced part of the blade, and is provided with a nut 14, for holding the anchor blade 11 in adjusted positions. Upon the rear face of the cutting or scraping blade 7 is a pair of angle irons or bars 15 and 16 secured at 17 to the blade. The forward end portions of the angle irons or bars 15 and 16 are provided with a plurality of apertures 19, through any two opposite apertures of which a bolt 20 extends, which also extends through the forward end of the channel iron or bar, thereby pivotally uniting the channel iron or bar and the cutting or scraping blade together. It is to be understood that the bolt 20 may be adjusted in any other opposite two of said apertures 19, so that the forward end of the body member may be adjusted from or toward the sharpened end 9 of the cutting blade. A plate 21 is secured at 22 to the outer face of the channel iron or bar near the lateral end thereof, and extending through the extreme end of this plate 21 and the channel iron or bar is a pivot bolt 23, on which the supporting disk or colter 24 is journaled, in order to support the rear lateral end of the body member or channel iron, and to guide the body member in its forward travel. Pivoted at 26 to the rear end of the body member is one end of the connecting bar 27, the other end of which is pivoted at 28 between the forks 29 of a bolt 30, which is carried by the rear end of one of the angle irons or bars 15 and 16.

Connected to an eye 31 of the body member or channel iron is one end of a draft chain 32, which is arranged in a loop, and has its other end connected at 33 to the cutting blade. Any suitable drafting means or equalizer may be connected to any one of the links of said chain, for drawing the road grader and ditching machine over the road bed. However, the drafting or equalizing means may be so connected to the chain that the line of draft is a little to one side of the body member, but between the body member and the cutting blade of the machine, and owing to the forward cutting edge of the cutting blade being considerably in advance of and to one side of the pivot 20, the cutting edge will more efficiently dig into the road bed, and tend to swing the rear lateral end of the cutting or scraping blade forwardly. The anchor blade 11 engages the road bed in such a manner, as to hold the scraping or cutting blade true to its work.

It is to be observed that the machine is capable of being inverted, therefore the forks 35 at the rear of the anchor blade serve as lifting means or hand grips, whereby the machine may be inverted. The anchor blade to hold the cutting or scraping blade true to its work may be adjusted, so that one or the other of the inclined edges 36 will ride upon the road bed, it depending mainly upon which side of the body member, the cutting or scraping blade is arranged.

The invention having been set forth, what is claimed as new and useful is:

1. In a road grading and ditching machine, a land side body member, a scraping blade adjustably pivoted to the forward end of the body member and provided with a forward cutting edge in advance of the pivot between the scraping blade and the body member, a draft loop connection having its ends connected to the outer faces of the body member and the scraping blade so that the line of draft extends from where the draft means may be connected to the said loop to and through the pivot between the blade and the body member, said blade and body member extending from their pivot connections at acute angles to the line of draft, which extends between said blade and body member.

2. In a road grading and ditching machine, a land side body member, a scraping blade adjustably pivoted to the forward end of the body member and provided with a forward cutting edge in advance of the pivot between the scraping blade and the body member, a draft loop connection having its ends connected to the outer faces of the body member and the scraping blade so that the line of draft extends from where draft means may be connected to the said loop to and through the pivot between the blade and the body member, said blade and body member extending from their pivot connections at acute angles to the line of draft, which extends between said blade and body member, and an anchor blade carried by the rear end of the scraping blade, to hold the blade true to its line of travel, said anchor blade having forks constituting hand holds for lifting the machine to invert the same.

3. A road grading and ditching machine comprising a land side body member consisting of a channel bar, angle brackets secured in the channel of said bar and arranged in pairs, a running board supported between said angle brackets, a scraper blade having angle irons arranged in parallelism upon and secured to the rear face of the scraper blade, means for adjustably pivoting the forward end of the channel bar between the angle irons of the scraper blade to the rear and to one side of the forward end of the scraper blade, a connection between the rear end of the channel bar and one of the angle irons of the scraper blade, and a draft chain arranged in a loop and connected to the outer faces of the channel bar and the scraper blade, so that the line of draft extends from the apex of the loop to and through the pivot and to one side of the forward edge of the scraper blade.

4. In a road grading and ditching machine, a land side member and scraping blade joined at their forward ends, a draft connection connected to the outer faces of the member and blade and having its line of draft extending through the joint and between the blade and the member, whereby the blade and the member extend at angles from the opposite sides of the line of draft, said blade having means on the forward part thereof extending beyond the joint and to a substantial distance to one side of the line of draft to coöperate with the road bed tending to sweep the rear extremity of the blade around and forwardly.

5. In a road grading and ditching machine, a land side member and a scraping blade joined together at their forward ends, a draft connection connected to the outer faces of the member and the blade, the line of draft extending from where draft means may connect to the draft connection to and through where the member and blade are joined and between the member and the blade, whereby the blade and member extend at angles from the line of draft, said blade having its forward portion extending a substantial distance beyond the joint between the blade and the member and a substantial distance to one side of the line of draft, whereby the forward lower cutting edge of said blade will cut into the road bed tending to sweep the rear extremity of the blade around and forwardly.

6. In a road grading and ditching machine, a land side member and a scraping blade joined together at their forward ends, a draft connection connected to the outer faces of the member and the blade, the line of draft extending from where draft means may connect to the draft connection to and through where the member and blade are joined and between the member and the blade, whereby the blade and member extend at angles from the line of draft, said blade having its forward portion extending a substantial distance beyond the joint between the blade and the member and a substantial distance to one side of the line of draft, whereby the forward lower cutting edge of said blade will cut into the road bed tending to sweep the rear extremity of the blade around and forwardly, and means on the rear extremity of the blade engaging the road bed to retard the sweeping tendency of the blade.

7. In a road grading and ditching machine, a land side member and a scraping blade joined together at their forward ends, a draft connection connected to the outer faces of the member and the blade, the line of draft extending from where draft means may connect to the draft connection to and through where the member and blade are joined and between the member and the blade, whereby the blade and member extend at angles from the line of draft, said blade having its forward portion extending a substantial distance beyond the joint between the blade and the member and a substantial distance to one side of the line of draft, whereby the forward lower cutting edge of said blade will cut into the road bed tending to sweep the rear extremity of the blade around and forwardly, said joint of the blade and member being adjustable to increase the extension of the blade a substantial distance for increasing the sweeping tendency.

8. In a road grading and ditching machine, a land side member and a scraping blade joined together at their forward ends, a draft connection connected to the outer faces of the member and the blade, the line of draft extending from where draft means may connect to the draft connection to and through where the member and blade are joined and between the member and the blade, whereby the blade and member extend at angles from the line of draft, said blade having its forward portion extending a substantial distance beyond the joint between the blade and the member and a substantial distance to one side of the line of draft, whereby the forward lower cutting edge of said blade will cut into the road bed tending to sweep the rear extremity of the blade around and forwardly, said joint of the blade and member being adjustable to increase the extension of the blade a substantial distance for increasing the sweeping tendency, and means on the rear extremity of the blade engaging the road bed and being adjustable to proportionately retard the sweeping tendency of the blade, and an adjustable connection between the rear parts of the member and the blade.

9. In a road grading and ditching machine, a land side member and a scraping blade, a pair of angle bars upon the rear inner face of the blade arranged in parallelism and having their forward ends disposed a substantial distance back from the forward end of the blade, the forward end of the land side member being joined to and between the forward end of said angle bars, whereby the blade is provided with a substantial extension beyond the joint, a draft connection connected to the outer faces of the member and the blade and having its line of draft extending through the joint and between the member and the blade which extends from opposite sides of the line of draft at angles thereto, and whereby the forward extension of the blade extends at a substantial distance to one side of the line of draft, an adjustable connection between the rear parts of the member and the blade, said joint of the blade and member being adjustable, which together with the adjustable connection constitutes compound means to increase the forward extension of the blade a substantial distance to one side of the line of draft to increase the forward sweeping tendency of the rear extremity of the blade, and means on the rear extremity of the blade engaging the road bed to retard the sweeping tendency of the blade.

In testimony whereof I have signed my name to this specification in the presence of two subscribing witnesses.

WILLIAM R. WILLIAMS.

Witnesses:
A. B. McCarty,
A. P. Neel.

Copies of this patent may be obtained for five cents each, by addressing the "Commissioner of Patents, Washington, D. C."